Oct. 1, 1957 R. LAPSLEY 2,807,935
VEHICLE DRIVE MEANS
Filed Jan. 5, 1953 4 Sheets-Sheet 1
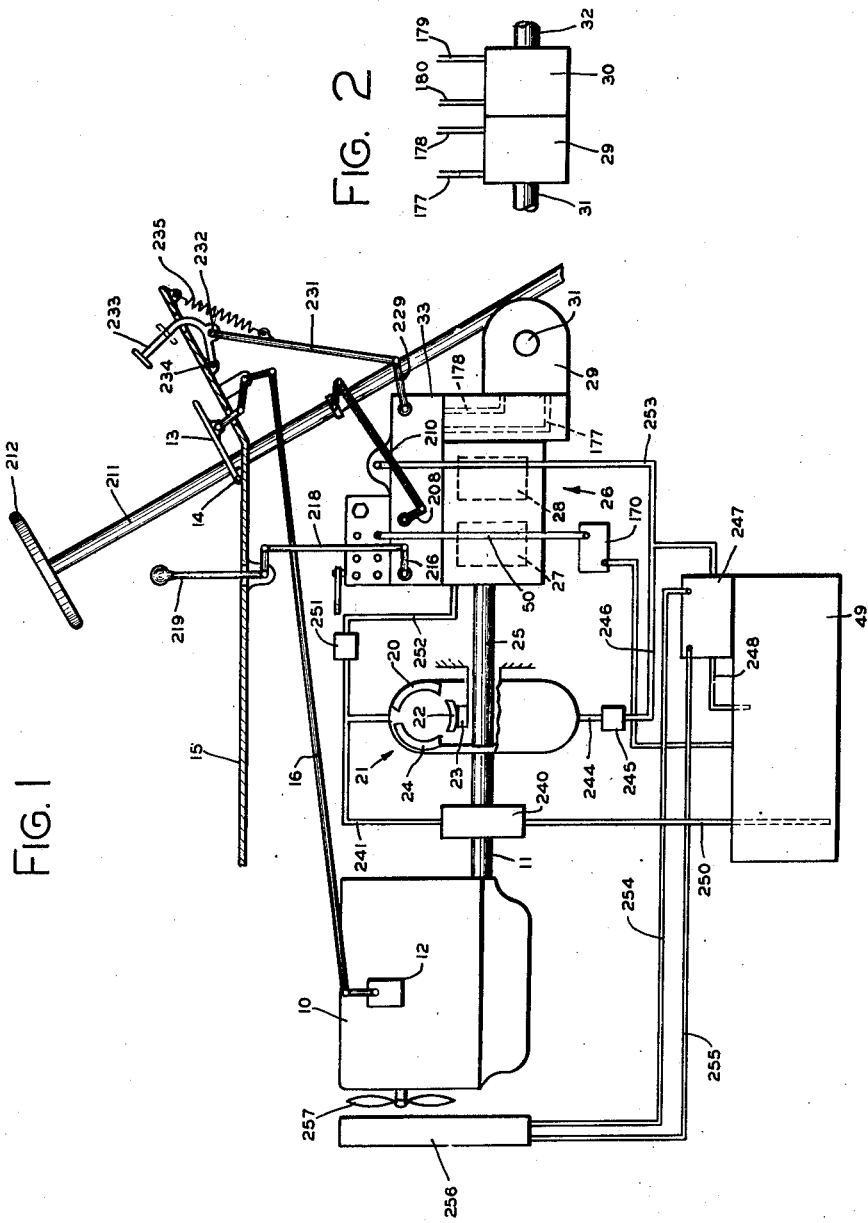
INVENTOR.
ROBERT LAPSLEY
BY
ATTYS.

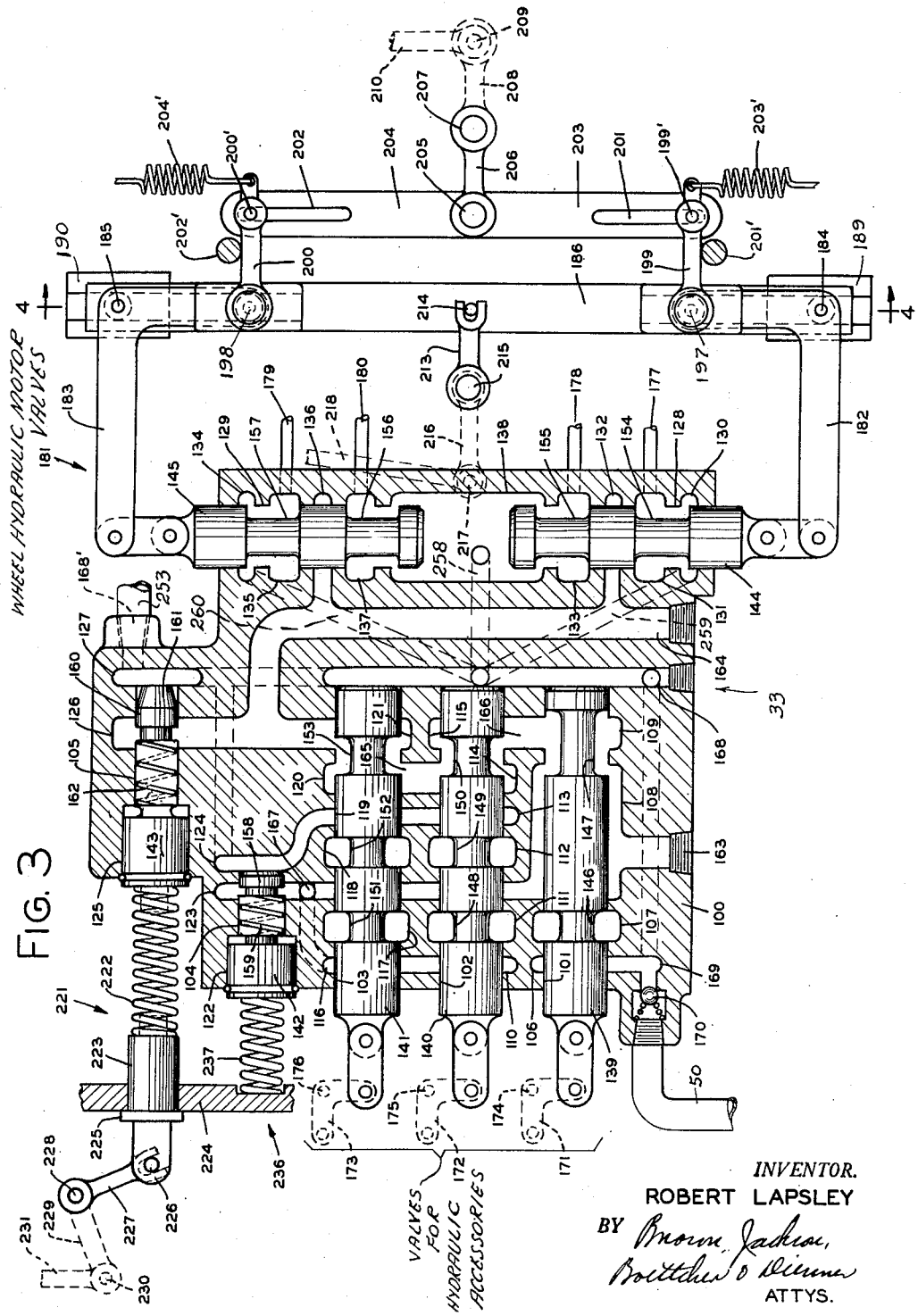

Oct. 1, 1957  R. LAPSLEY  2,807,935
VEHICLE DRIVE MEANS
Filed Jan. 5, 1953  4 Sheets-Sheet 3

INVENTOR.
ROBERT LAPSLEY
BY
ATTYS.

Oct. 1, 1957

R. LAPSLEY 2,807,935

VEHICLE DRIVE MEANS

Filed Jan. 5, 1953

INVENTOR.
ROBERT LAPSLEY
BY
ATTYS.

United States Patent Office 2,807,935
Patented Oct. 1, 1957

2,807,935

VEHICLE DRIVE MEANS

Robert Lapsley, Buchanan, Mich., assignor to Clark Equipment Company, Buchanan, Mich., a corporation of Michigan Application January 5, 1953, Serial No. 329,495

5 Claims. (Cl. 60—53)

My present invention relates generally to vehicle drive means, and, more specifically, is directed to hydrostatic power transmission mechanisms.

Conventional hydrostatic power transmission mechanisms with which I am acquainted comprise a hydraulic pump which drives a pair of independent hydraulic motors drivingly connected with the drive wheels of a vehicle. In one form of such transmission mechanism, a constant displacement hydraulic pump is embodied for delivering fluid at constant volume and pressure to the hydraulic motors. Since the pressure of the fluid delivered by this type of pump is proportional to the displacement at which the pump is driven, it will be apparent that the fluid delivered to the motors is not always at the desired pressure for driving the motors.

In another form of hydraulic power transmission mechanisms, a variable displacement hydraulic pump has been substituted for the constant displacement pump described above. While, from the standpoint of operation, the variable displacement pump has proved fairly satisfactory, the cost of such pump has prohibited its application in many fields of power transmission. The variable displacement pump is not only costly because of its complex construction, but, also, requires continual maintenance.

It is an object of my present invention to provide a hydraulic power transmission mechanism which has the advantages of a variable displacement pump without the attendant disadvantages thereof.

It is another object of my present invention to provide a hydraulic power transmission mechanism, as described, which is characterized by the provision of a constant displacement pump driven by a conventional hydrodynamic torque converter.

In the accomplishment of the above objects, I contemplate the provision of a hydraulic power transmission mechanism comprising a prime mover the output shaft of which is utilized for driving the pump element of a hydraulic torque converter. The turbine element of the torque converter has a driving connection with a constant displacement hydraulic pump which develops fluid under pressure for driving one or more hydraulic motors. The hydraulic motors, in turn, have driving connection with the drive wheels of the vehicle in which the transmission mechanism is embodied. The torque converter is associated with the pump for providing the required torque multiplication. The aforedescribed transmission mechanism is substantially equivalent in characteristics to the conventional transmission mechanism wherein a variable displacement pump is embodied.

It is a further feature of my present invention that a secondary fluid circuit, including a second hydraulic pump, a flow divider, and a cooler, is provided for supplying cooling fluid, under moderate pressure, to the torque converter. The secondary fluid circuit, in addition, has connection with the primary fluid circuit of the hydraulic pump and motors whereby a portion of the driving fluid flowing through the latter circuit is withdrawn, cooled, and returned to the primary fluid circuit.

It is a further object of my present invention to provide the afore-noted drive means with a novel arrangement of valves whereby the operator of the vehicle in which my present invention is embodied is afforded complete and flexible control over the drive means.

In carrying out the last-noted object, I provide a pressure relief valve controllable by a foot pedal which may be suitably actuated for infinitely varying the pressure of the driving fluid between a predetermined allowable maximum pressure and zero pressure. In order to permit the vehicle to negotiate sharp turns, I provide valve means, responsive to rotary movement of the hand steering wheel, for controlling the direction of fluid flow to the drive motors. The valve means is operable to direct fluid in either direction to one motor, or to direct fluid in either direction to both motors, or to direct fluid in opposition directions to the motors. It will thus be apparent that the operator of the vehicle has complete control in maneuvering the vehicle.

Now, in order to acquaint those skilled in the art with the manner of constructing and using hydrostatic power transmission mechanisms in accordance with the principles of my present invention, I shall describe in connection with the accompanying drawings, a preferred embodiment of my invention.

In the drawings:

Figure 1 is a diagrammatic showing of the vehicle drive means of my present invention;

Figure 2 is a partial end elevational view of the drive means of Figure 1;

Figure 3 is a schematic layout of the control valve means of my present invention;

Figure 4:
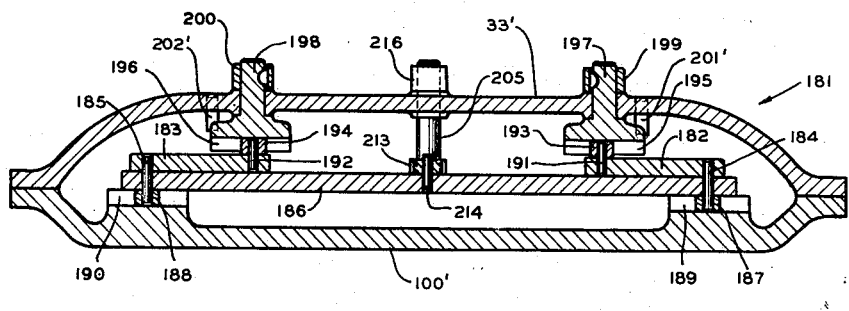
Figure 4 is a cross-sectional view of the control valve means taken along the line 4—4 in Figure 3 looking in the direction indicated by the arrows.

Referring now to the drawings, there is indicated by the reference numeral 10 a prime mover having an output shaft 11. The prime mover preferably takes the form of an internal combustion engine. The throttle 12 of the prime mover 10 is controlled by an accelerator pedal 13 pivotally mounted at 14 to the floorboard 15 of the vehicle. The accelerator pedal 13 and throttle are interconnected by suitable linkage means indicated generally at 16. The output shaft 11 of the prime mover 10 has secured thereon the pump element 20 of a hydraulic torque converter indicated generally by the reference numeral 21. The reaction member 22 of the torque converter 21 is suitably mounted for rotation in one direction on a one-way brake assembly indicated at 23. The turbine element 24 of the torque converter 21 is secured to the one end of the drive shaft 25 of a pump 26 which is of the constant displacement type.

The pump 26 comprises two separate pumping sections 27 and 28 which, in a manner to be described more fully hereinafter, serve to develop fluid under pressure for driving a pair of hydraulic motors 29 and 30. The motors 29 and 30, respectively, have output shafts 31 and 32 which preferably have a driving connection with the wheels (not shown) of the vehicle in which the present drive means is embodied.

A primary fluid circuit is provided for establishing a path for the fluid to flow between the pump 26 and the motors 29 and 30. The primary fluid circuit comprises fluid passageway means arranged between the pump 26 and the motors 29 and 30 and includes a valve mechanism 33 interposed in the fluid passageway means for controlling the flow of fluid to the motors 29 and 30 and, in addition, for controlling the flow of fluid to various auxiliary devices.

The construction of the valve mechanism is shown schematically in Figure 3. A valve block 100 is provided in which are formed cylindrical valve openings 101, 102, 103, 104 and 105. Annular grooves 106, 107, 108 and 109 are formed in the periphery of the valve opening 101; annular grooves 110, 111, 112, 113, 114 and 115 are formed in the periphery of the valve opening 102; and annular grooves 116, 117, 118, 119 120 and 121 are formed in the periphery of the valve opening 103. The valve opening 104 has formed in the periphery thereof an annular channel 122 and annular grooves 123 and 124, and the valve opening 105 has formed in the periphery thereof an annular channel 125 and annular grooves 126 and 127.

The valve block 100 also has formed therein axially aligned valve openings 128 and 129. The valve opening 128 has formed in the periphery thereof annular grooves 130, 131, 132 and 133; and the valve opening 129 has formed in the periphery thereof annular grooves 134, 135, 136 and 137. The facing ends of the valve openings 128 and 129 are interconnected by a common annular channel 138.

Slidably mounted respectively in the valve openings 101, 102, 103, 104, 105, 128 and 129 are valve members 139, 140, 141, 142, 143, 144 and 145. Annular grooves 146 and 147 are formed in the periphery of the valve member 139; annular grooves 148, 149 and 150 are formed in the periphery of the valve member 140; annular grooves 151, 152 and 153 are formed in the periphery of the valve member 141; annular grooves 154 and 155 are formed in the periphery of the valve member 144; and annular grooves 156 and 157 are formed in the periphery of the valve member 145. The valve member 142 is formed with a reduced end portion 158 which, centrally of the ends thereof, has spiral grooves 159 cut in the periphery. The valve member 143 has a reduced end portion 160 including a tapered nose 161. Spiral grooves 162 are cut in the periphery of the valve member 143 centrally of the ends thereof.

The discharge side of the pump section 27 of the primary pump 26 has connection with a fluid passageway 163 which, in turn, communicates with the annular groove 108 in valve opening 101. The discharge side of the pump section 28 of the primary pump 26 has connection with a fluid passageway 164 which, in turn, communicates with the annular groove 126 in valve opening 105 and the annular groove 121 in valve opening 103. Passageway 164 further communicates with the annular groove 132 in valve opening 128 and the annular groove 136 in the valve opening 129. A passageway 165 interconnects annular grooves 120 and 114 and a passageway 166 interconnects annular grooves 115 and 109. A passageway 167 further interconnects annular groove 123 and the valve openings 101, 102 and 103.

A return fluid passageway 168, which communicates with the intake sides of both of the pump sections 27 and 28 of the primary pump 26, connects with the annular channel 138, at 258 and the annular grooves 127, 124, 116, 110, 119 and 113. Annular grooves 130 and 134 also connect with the return line 168 through passageway means 259 and 260. The annular groove 106 in valve opening 101 connects with a passageway 169 which communicates with the sump tank 49 through a line 50 shown in Figure 1. A relief valve 170 is placed in the passageway 169 and communicates with the return line 168 for a purpose to be discussed more fully hereinafter.

A single acting auxiliary device (not shown) is connected to the annular groove 107 in valve opening 101 and double acting auxiliary devices (not shown) are connected, respectively, to the annular grooves 111 and 112 in valve opening 102 and annular grooves 117 and 118 in valve opening 103. Rectilinear movement of the valve members 139, 140 and 141 is adapted to be selectively effected by means of bell cranks 171, 172 and 173 mounted on fixed pivots 174, 175 and 176. Movement of the bell cranks 171, 172 and 173 may be effected through any suitable linkage means.

Fluid lines 177 and 178 connect at one end respectively with the annular grooves 131 and 133 in the valve opening 128 and at the other end with the fluid motor 29. Fluid lines 179 and 180 connect at one end respectively with the annular grooves 135 and 137 in the valve opening 129 and at the other end with the fluid motor 30. Rectilinear movement of the valve members 144 and 145 within the valve openings 128 and 129 is effected by means of actuating linkage indicated generally at 181 and shown in detail in Figures 3, 4, 5, 6 and 7.

Pivotally mounted to the one ends of the valve members 144 and 145 are the one legs of L-shaped levers 182 and 183 which in turn are pivotally mounted on pins 184 and 185 carried at the ends of a bar 186. Rollers 187 and 188 are mounted on the pins 184 and 185 below the bar 186 and the rollers 187 and 188 are guided respectively in grooves 189 and 190 formed in the valve housing 100'. The other legs of the L-shaped levers 182 and 183 have secured therein pin members 191 and 192 upon which are mounted rollers 193 and 194. The rollers 193 and 194 are guided in grooves 195 and 196 formed at the lower ends of shafts 197 and 198. Levers 199 and 200 are rigidly secured at their one ends to the upper ends of shafts 197 and 198 and at their other ends have pins 199' and 200' which are mounted for sliding movement within openings 201 and 202 formed in the ends of shifter links 203 and 204 pivotally connected together about a pin 205. The links 203 and 204 are normally maintained in the position shown in Figure 3, against stops 201' and 202', by means of springs 203' and 204'. A lever 206 is secured at one end to the pin 205 and at the other end to a fixed pivot shaft 207 to which outwardly of the valve housing 101' is secured the one end of a lever 208. The other end of the lever 208 is pivotally secured at 209 to a draw bar 210 which is actuated through rotary movement of the steering column 211 of the hand steering wheel 212.

The actuating linkage 181 further comprises a lever member 213 disposed about a pin 214 carried by the bar 186. The other end of the lever member is secured to a shaft 215 which extends outwardly of the valve cover 33' and has secured thereto the one end of a lever 216. The lever 216 is pivotally mounted at 217 to a draw rod 218 which is actuated by a forward-reverse selector lever 219 extending through the vehicle floor board 15.

Assuming now that the pump 26 is being driven and the valve members are in the position shown in Figure 3, fluid under pressure will be delivered by the pump section 27 to the passageway 163 and fluid under pressure will be delivered by the pump section 28 to the passageway 164. Since the passageways 163 and 164 are in communication, the fluid delivered by both pump sections 27 and 28 will be joined and will be available for powering the fluid motors 29 and 30.

Figure 5:
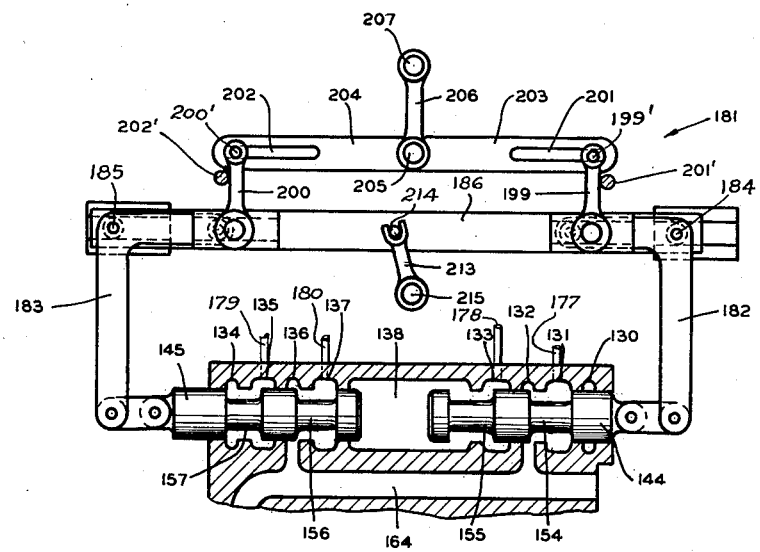
Figures 5, 6 and 7 are partial views of the control valve means of Figure 3 with the elements thereof being shown in various operating positions.

Now, should it be desired to drive the vehicle in a forward direction, the forward-reverse lever 219 is suitably actuated for pivoting the lever 213 counterclockwise as viewed in Figure 5. Such pivotal movement of the lever 213 causes the bar 186 and the L-shaped levers 182 and 183 to shift to the left which, in turn, causes the valve members 144 and 145 to shift to the left. With the valve members 144 and 145 in the position shown in Figure 5, annular grooves 131 and 132 and annular grooves 136 and 137 are placed in communication. Thus, fluid under pressure is directed to the fluid motors 29 and 30 through the fluid lines 177 and 180. Fluid passing through the fluid motors 29 and 30 is returned through the fluid lines 178 and 179 to the annular grooves 133 and 135 and thence into annular grooves 130 and 134 which communicate with the return line 168, thus providing a continuous primary fluid circuit.

The fluid motors 29 and 30 may be driven in a reverse direction by suitably actuating the lever 219 so as to pivot the lever 213 clockwise. As a result of such action, the valve members 144 and 145 are shifted to the right from the position shown in Figure 5 whereupon fluid under pressure is directed to the motors through fluid lines 178 and 179 and returned therefrom through fluid lines 177 and 180.

Figure 6:
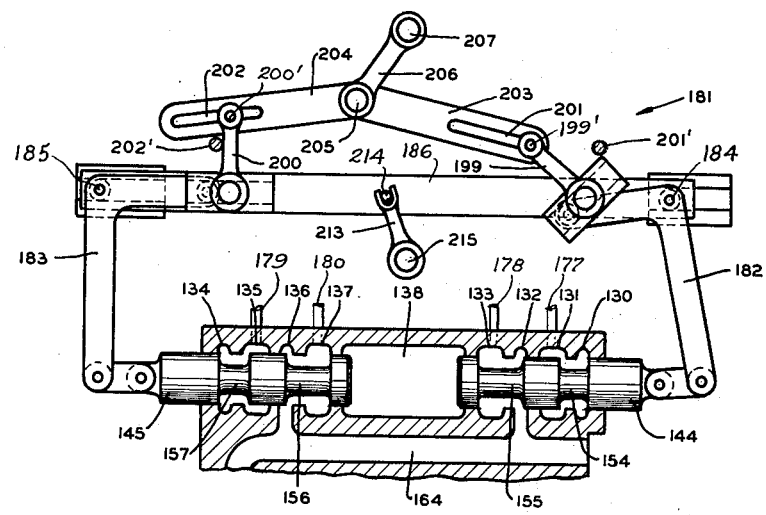

The control mechanism of my present invention is further adapted to facilitate turning of the vehicle by controlling the flow of fluid to the fluid motors 29 and 30. For example, with the vehicle proceeding forwardly, the hand steering wheel 212 may be rotated for effecting turning of the vehicle. Rotation of the hand steering wheel 212 for a right turn causes clockwise pivotal movement of the lever 206 which, as shown in Figure 6, moves the shifter links 203 and 204 to the left. Since the pin 200' is free to slide within the opening 202 no movement of the L-shaped lever 183 or valve 145 will take place. Thus, the motor 30 will continue to be driven in a forwardly direction. However, as the link 203 is moved to the left of the lever 199 and shaft 197 are pivoted causing the groove 195 to be disposed diagonally of the bar 186. Pivotal movement of the shaft 197, in turn, causes the roller 193 to ride along the groove 195 thus effecting pivotal movement of the L-shaped lever 182 about the pin 184. Such movement of the L-shaped lever 182 pulls the valve member 144 to the right thereby progressively cutting off the flow of fluid to both sides of the fluid motor and then reversing the direction of fluid flow through the motor 29.

From the foregoing description it should be understood that a slight rotary movement of the hand steering wheel 212 will not effect movement of the valve but a medium movement of steering wheel 212 will effect a medium movement of the valves and cause idling of the motor 29 thus permitting the associated drive wheel to serve as a pivot, while a large rotary movement of the hand steering wheel 212 will cause the motor 29 to be driven in a reverse direction thus permitting the vehicle to pivot about a point intermediate of the drive wheels associated with the motors 29 and 30.

Figure 7:
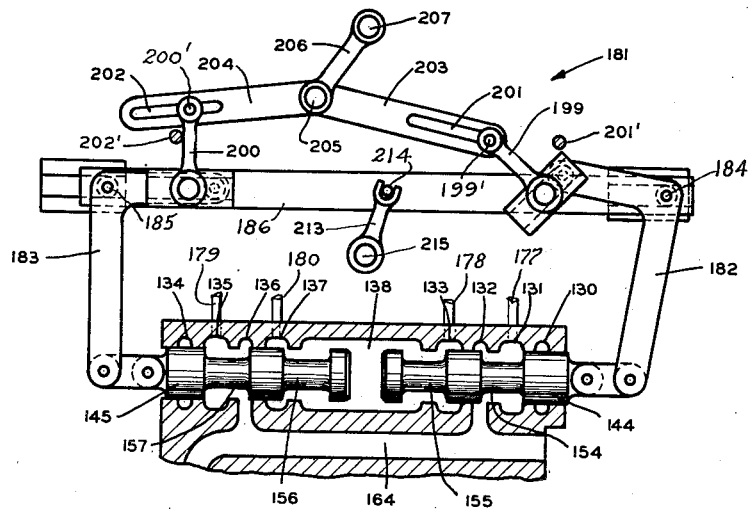

If, after the vehicle has been turned while being propelled in a forward direction, it is desired to back the vehicle over the same path, the selector lever 219 need only be actuated for pivoting the lever member 213 from the position shown in Figure 6 to the position shown in Figure 7. Pivotal movement of the lever member 213 will cause the bar 186, together with the pivot pins 184 and 185 to move to the right. As a result of such movement of the linkage 181, the valve members 144 and 145 are urged toward each other changing the direction of fluid flow through the motors 29 and 30. That is, the motor 29 will be driven in a forward direction, while the motor 30 will be driven in a reverse direction.

It is to be understood that the vehicle may be turned in the opposite direction from that described above by suitable rotation of the hand steering wheel 212 in a direction causing counterclockwise pivotal movement of the lever 206 from the position shown in Figure 5.

In order to limit the pressure of the fluid flowing to the fluid motors 29 and 30, a relief valve, Figure 3, assembly indicated generally at 221 is provided. The assembly 221 includes the aforedescribed valve member 143 and further comprises a spring 222 abutting the head of valve 143 and the one end of the plunger 223 slidably mounted in a partition wall 224. A stop collar 225 is secured to the plunger 223 outwardly of the partition wall 224. A pin 226 is secured in the end of the plunger 223 and disposed about this pin 226 is the one end of a lever member 227 which at its other end is secured to a pivot shaft 228. A lever 229 is secured at one end to the shaft 228 and at the other end is pivoted at 230 to a draw rod 231 pivotally connected at 232, as shown in Figure 1, to a foot pedal 233. The foot pedal 233 is pivotally mounted at 234 to the vehicle floor board 15 and is normally maintained in the position shown in Figure 1 by a spring 235. The spring 235 serves to place a biasing force on the plunger 223, through the interconnecting linkage, for maintaining the latter in the position shown in Figure 3.

Fluid under pressure flowing through the passageway 164 is directed through the spiral grooves 162 in the valve member 143 to the head end of the latter member. The fluid thus exerts a force against the spring 222. If the pressure of the fluid exceeds the predetermined desired pressure, as established by the setting of spring 222, the valve member 143 will move to the left together with the reduced end portion 160. As the valve member 143 moves to the left, fluid is permited to flow past the tapered nose portion 161 into the return passageway 168. This serves to relieve the pressure of the fluid flowing to the motors 29 and 30.

The relief valve assembly 221 is also controllable by the operator of the vehicle. By suitable depression of the foot pedal 233, the plunger 223 may be moved to the left thus decreasing the force exerted by the spring on the valve member 143. By virtue of this arrangement, the presusre of the fluid flowing to the motors 29 and 30 may be decreased from maximum pressure to zero pressure. Conversely, by releasing the foot pedal 233, the pressure of fluid flowing to the motors 29 and 30 may be increased from zero pressure to maximum pressure.

I shall describe the operation of the accessory control valves 139, 140 and 141. With the valves 139, 140 and 141 in the positions shown in Figure 3, no fluid is directed to the accessories. If it is desired to actuate the single acting auxiliary device connected to the annular groove 107, bell crank 171 is pivoted for moving the valve member 139 to the right. The annular grooves 107 and 108 will be placed in communication through the annular groove 146 in valve 139. As the valve 139 is moved to the right, communication between annular grooves 108 and 109 is interrupted and thus the entire fluid output of the pump section 27 is directed to the auxiliary device. It is to be noted that this does not intrerupt fluid flow between the pump section 28 and the fluid motors 29 and 30. Fluid may be maintained in the single acting device by returning the valve 139 to the position shown in Figure 3 or the fluid may be bled therefrom by moving the valve 139 to the left for placing the annular grooves 106 and 107 in communication. In this position of the valve 139, fluid is returned to the sump tank 49, or if the pressure builds up, it will be by-passed through the valve 170 to the return line 168.

If it should be desired to actuate the double acting auxiliary device connected to the annular grooves 111 and 112, the valve 140 may be moved either to the right or to the left depending on the direction in which the auxiliary device is to be actuated. If the valve 140 is moved to right, fluid from pump 27 is directed to the annular groove 111 as the latter groove and line 167 are placed in communication through annular groove 148. Simultaneously, annular groove 112 is placed under bleed as the latter groove communicates through annular groove 149 with the return line 168. Reverse actuation may be effected by moving the valve 140 to the left whereupon fluid is directed to the annular groove 112 while fluid is bled from annular groove 111. As the valve 140 is moved either to the left or to the right, communication between annular grooves 114 and 115 is interrupted and, as a result, the entire fluid output of the pump section 27 is directed to the last-noted auxiliary device. Here, again, fluid flow between the pump section 28 and the fluid motors 29 and 30 is not interrupted.

The double acting auxiliary device connected to the annular grooves 117 and 118 may be actuated in the same manner as the last described double acting auxiliary device.

A pressure relief assembly indicated generally at 236 is provided for limiting the pressure of the fluid in passageway 167. The assembly 236 includes the aforedescribed valve member 142 and further comprises a spring 237 arranged between the head of valve 142 and the partition wall 224.

Fluid under pressure flowing through the passageway 167 is directed through the spiral grooves 159 in the valve member 142 to the head end of the latter member. If the pressure of the fluid exceeds the predetermined desired pressure, as established by the setting of spring 237, the valve member 142 is moved to the left disposing reduced end portion 158 thereof so that passageway 167 via annular grooves 123 and 124 is placed in communication with the return passageway 168. The pressure relief assembly 236 thus serves to limit the pressure of the fluid flowing to the auxiliary devices and to the motors 29 and 30, so as to prevent such pressure from exceeding a safe maximum pressure.

The aforedescribed structure constitutes the primary fluid circuit of my present invention. My present invention also includes a secondary fluid circuit which is provided for supplying fluid under pressure to the torque converter 21. Referring again to Figure 1, the secondary fluid circuit includes an auxiliary pump 240 which is driven in a conventional manner from the output shaft 11 of the prime mover 10. The discharge side of the auxiliary pump 240 has connection through a fluid conduit 241 with the torque converter 21.

A fluid conduit 244 has connection at one end with the torque converter 21 and at the other end with an orifice 245 which serves to limit the volume of the fluid flowing through the torque converter 21. Connected in series between the orifice 245 and the auxiliary pump 240 are a fluid conduit 246, a cooler 247, a fluid conduit 248, the sump tank 49, and a fluid conduit 250.

The secondary fluid circuit is connected with the primary fluid circuit. The conduit 241 has connection with a flow divider 251 which, in turn, has connection through a fluid conduit 252 with the intake side of the pump 26. In addition, a fluid conduit 253 interconnects the highest point 168' of the return line 168 of the primary fluid circuit with the conduit 246 of the secondary fluid circuit, this connection being located at the highest point 168' of the return line 168 so that any air entrained in the primary fluid may rise to this highest point and be evacuated from the primary fluid circuit to the tank from which it is allowed to escape.

Water is circulated through the cooler 247 by means of conduits 254 and 255 having connection with an engine radiator 256. The water flowing through the radiator 256 is cooled by an engine driven fan 257.

The primary and secondary fluid circuits cooperate in the following manner. With the prime mover 10 rotating, the auxiliary pump 240 delivers fluid under pressure to the torque converter 21, and torque multiplication is effected between the output shaft 11 of the prime mover 10 and the input or drive shaft 25 of the pump 26. Now, with the pump 26 rotating, fluid under pressure is delivered to the valve mechanism 33 in the manner described hereinbefore. The fluid characteristics of the torque converter driven constant displacement pump are substantially the same as obtained by means of a variable displacement pump which has the disadvantages of having both a high initial cost and high maintenance cost. These disadvantages have been obviated in my present invention.

The secondary fluid circuit not only serves to supply fluid under pressure to the torque converter 21 but also has connection with the primary fluid circuit whereby a portion of the fluid and any entrained air flowing in the primary fluid circuit is continuously withdrawn and an equivalent portion of cooler fluid without entrained air added thereto. The fluid is withdrawn from the primary fluid circuit through the conduit 253 while an equivalent amount of fluid, which has passed through the cooler 247, is added to the primary fluid circuit through the conduit 252. Thus, the fluid flowing in the primary fluid circuit is continuously cooled.

By way of exemplification and not limitation, the auxiliary pump 240 preferably delivers approximately 10 G. P. M. The orifice 245 serves to limit fluid flow through the torque converter to approximately 3 G. P. M. As a result, the fluid delivered by the auxiliary pump 240, over and above 3 G. P. M., i. e. 7 G. P. M., is delivered through the conduit 252 to the primary fluid circuit. Since, only 3 G. P. M. of fluid is flowing in the conduit 246 returning from the torque converter 21, 7 G. P. M. of fluid is withdrawn from the primary fluid circuit through the conduit 253 to make up the required volume of fluid required at the intake side of the auxiliary pump 240.

Now, while I have shown and described the fluid of the primary fluid circuit as flowing from two separate pumping elements and being capable of being divided into two separate fluid circuits, or combined into one common fluid circuit, it will be readily understood that a single pumping element can be used and its flow directed for one or all uses, as desired, by sacrificing the advantages of the dual flow as secured when two or more pumping elements are used.

Now, while I have shown and described what I believe to be preferred embodiment of my present invention, it will be understood that various rearrangements and modifications may be made therein without departing from the spirit and scope of my present invention.

I claim:

1. In a hydraulic power transmission mechanism for a vehicle, the combination of at least one hydraulic motor for driving the vehicle, a constant displacement hydraulic pump for developing fluid under pressure for driving said motor, a prime mover, accelerator means for controlling the speed of said prime mover and a hydraulic torque converter comprising impeller, reaction and turbine elements, said impeller element having connection with said prime mover and said turbine element having connection with said pump for establishing an infinitely variable driving connection between said prime mover and said pump, whereby the torque for driving the vehicle is selectively variable by manipulation of said accelerator means.

2. In a hydraulic power transmission mechanism for a vehicle, the combination of a pair of hydraulic motors for driving the vehicle, a constant displacement hydraulic pump for developing fluid under pressure for driving said motors, fluid conduits between said pump and said motors, valve means interposed in said conduits whereby the speed and direction of drive of said motors may be selectively varied, a prime mover, accelerator means for controlling the speed of said prime mover, and a hydraulic torque converter comprising impeller, reaction and turbine elements, said impeller element having connection with said prime mover and said turbine element having connection with said pump for establishing an infinitely variable driving connection between said prime mover and said pump, whereby the torque for driving the vehicle is selectively variable by manipulation of said accelerator means.

3. In a hydraulic power transmission mechanism, the combination of at least one hydraulic motor, a constant displacement hydraulic pump for developing fluid under pressure for driving said motor, fluid conduits between said pump and said motor, valve means interposed in said conduits whereby the direction of drive of said motor may be selectively varied, second valve means in said conduit including a manually controllable infinitely variable pressure relief valve for infinitely varying the pressure of the driving fluid between a predetermined allowable maximum pressure and zero pressure, a prime mover, and a hydraulic torque converter interposed between said prime mover and said pump for establishing an infinitely variable driving connection between said prime mover and said pump.

4. In a hydraulic power transmission mechanism, the combination of at least one hydraulic motor, a constant displacement hydraulic pump for developing fluid under pressure for driving said motor, fluid conduits between said pump and said motor, valve means interposed in said conduits whereby the direction of drive of said motor may be selectively varied, second valve means in said conduit including a manually controllable infinitely variable pressure relief valve for infinitely varying the pressure of the driving fluid between a predetermined allowable maximum pressure and zero pressure, a secondary fluid circuit having connection with said conduits for withdrawing a portion of the driving fluid from the latter, cooling the withdrawn fluid, and returning it to said conduits, a prime mover, and a hydraulic torque converter connected in said secondary fluid circuit and interposed between said prime mover and said pump for establishing an infinitely variable driving connection between said prime mover and said pump.

5. In combination, a prime mover, control means for varying the speed and power of said prime mover, a hydraulic fluid torque converter comprising impeller, reaction and turbine elements, said impeller element having driving connection with said prime mover to provide an infinitely variable torque output to said turbine element under the control of said control means, and a constant displacement hydrostatic fluid pump driven by said turbine element of said fluid torque converter whereby the volume and pressure of the fluid delivered thereby may be selectively varied by manipulation of said control means.

References Cited in the file of this patent
UNITED STATES PATENTS

| | | |
|---|---|---|
| 1,026,662 | Eisner | May 21, 1912 |
| 1,176,307 | Manly | Mar. 21, 1916 |
| 2,183,541 | Centervall | Dec. 19, 1939 |
| 2,316,944 | Ernst | Apr. 20, 1943 |
| 2,324,693 | Griswold et al. | July 20, 1943 |
| 2,363,977 | Kucher | Nov. 28, 1944 |
| 2,370,526 | Doran | Feb. 27, 1945 |
| 2,421,013 | Cornell | May 27, 1947 |
| 2,453,877 | Trail | Nov. 16, 1948 |
| 2,483,651 | Lee | Oct. 4, 1949 |
| 2,558,496 | Reeves | June 26, 1951 |
| 2,558,976 | O'Leary | July 3, 1951 |
| 2,651,377 | Lapsley et al. | Sept. 8, 1953 |
| 2,681,117 | Marcy | June 15, 1954 |